(12) United States Patent
Takechi et al.

(10) Patent No.: US 11,324,207 B2
(45) Date of Patent: May 10, 2022

(54) DUAL-BEARING REEL

(71) Applicant: Shimano Inc., Sakai (JP)

(72) Inventors: Kunio Takechi, Sakai (JP); Shoji Nakagawa, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 17/158,574

(22) Filed: Jan. 26, 2021

(65) Prior Publication Data

US 2021/0298281 A1   Sep. 30, 2021

(30) Foreign Application Priority Data

Mar. 27, 2020   (JP) .............................. JP2020-058260

(51) Int. Cl.
*A01K 89/01*      (2006.01)
*A01K 89/015*    (2006.01)

(52) U.S. Cl.
CPC ................................ *A01K 89/0193* (2015.05)

(58) Field of Classification Search
CPC .............. A01K 89/0192; A01K 89/004; A01K 89/01931
See application file for complete search history.

(56) References Cited

U.S. PATENT DOCUMENTS

2010/0006687 A1*  1/2010  Ikuta ................ A01K 89/01909
                                                        242/243
2018/0332834 A1* 11/2018  Takechi ............ A01K 89/0192

FOREIGN PATENT DOCUMENTS

| JP | 6374700 B | | 8/2018 | |
|---|---|---|---|---|
| JP | 2018191589 A | * | 12/2018 | .......... A01K 89/015 |
| JP | 2019122326 A | * | 7/2019 | |
| KR | 20140128223 A | * | 11/2014 | |

* cited by examiner

*Primary Examiner* — Emmanuel M Marcelo
(74) *Attorney, Agent, or Firm* — United IP Counselors, LLC

(57) ABSTRACT

A dual-bearing reel configured to feed a fishing line forward is disclosed. The dual-bearing reel includes a reel body and a handle. The reel body has a first side plate, a second side plate, and a connecting portion. The first side plate includes a circular portion having a circular shape, and a bulging portion bulging forward and downward from the circular portion. The second side plate is circular and disposed apart from the first side plate. The connecting portion connects the first side plate and the second side plate. The handle is rotatably mounted on the first side plate. A first central axis of the circular portion of the first side plate is offset forward and downward from a second central axis of the second side plate.

5 Claims, 4 Drawing Sheets

DUAL-BEARING REEL

CROSS-REFERENCE TO RELATED APPLICATIONS

This application claims priority to Japanese Patent Application No. 2020-058260, filed Mar. 27, 2020. The contents of that application are incorporated by reference herein in their entirety.

TECHNICAL FIELD

The present invention relates to a dual-bearing reel.

BACKGROUND ART

A dual-bearing reel includes a reel body having a pair of side plates, a spool, a handle, and a rotation transmission mechanism (see Japanese Patent No. 6374700). The spool is disposed between the side plates. The handle is located on one of the side plates. The rotation transmission mechanism transmits the rotation of the handle to the spool. The rotation transmission mechanism is arranged on the handle-side portion of the reel body.

BRIEF SUMMARY

In the reel body, the handle-side portion of the reel body tends to be larger than the non-handle-side portion due to the arrangement of the rotation transmission mechanism. For example, in the dual-bearing reel of Japanese Patent No. 6374700, the side plate on the handle-side portion (except the portion bulging forward) and the side plate on the non-handle-side portion are formed so as to be concentrically circular with respect to the rotation axis of the spool. In this case, if the side plate on the handle-side portion has a diameter increased to accommodate the rotation transmission mechanism, the reel body increases in size on the handle-side portion, resulting in an unnecessary space.

An object of the present invention is to provide a dual-bearing reel that includes a reel body having a downsized handle-side portion.

A dual-bearing reel according to one aspect of the present invention is configured to feed a fishing line forward. The dual-bearing reel includes a reel body and a handle. The reel body has a first side plate, a second side plate, and a connecting portion. The first side plate includes a circular portion having a circular shape and a bulging portion bulging forward and downward from the circular portion. The second side plate is circular and disposed apart from the first side plate. The connecting portion connects the first side plate and the second side plate. The handle is rotatably mounted on the first side plate. The circular portion of the first side plate has a central axis that is offset forward and downward from a central axis of the second side plate.

In the dual-bearing reel, the central axis of the circular portion of the first side plate is offset forward and downward from the central axis of the second side plate. That is, the central axis of the circular portion of the first side plate is offset in a direction in which the bulging portion of the first side plate bulges with respect to the central axis of the second side plate. As a result, it is possible to reduce an unnecessary space in and around upper and rear portions of the circular portion of the first side plate. Thus, the handle-side portion of the reel body can be downsized.

The dual-bearing reel further includes a spool that is rotatably supported on the reel body. The spool has a rotation axis that coincides with the central axis of the second side plate. In this case, the non-handle-side portion of the reel body can be downsized.

The present invention provides a dual-bearing reel having a reel body with a downsized handle-side portion.

DETAILED DESCRIPTION

Figure 1:
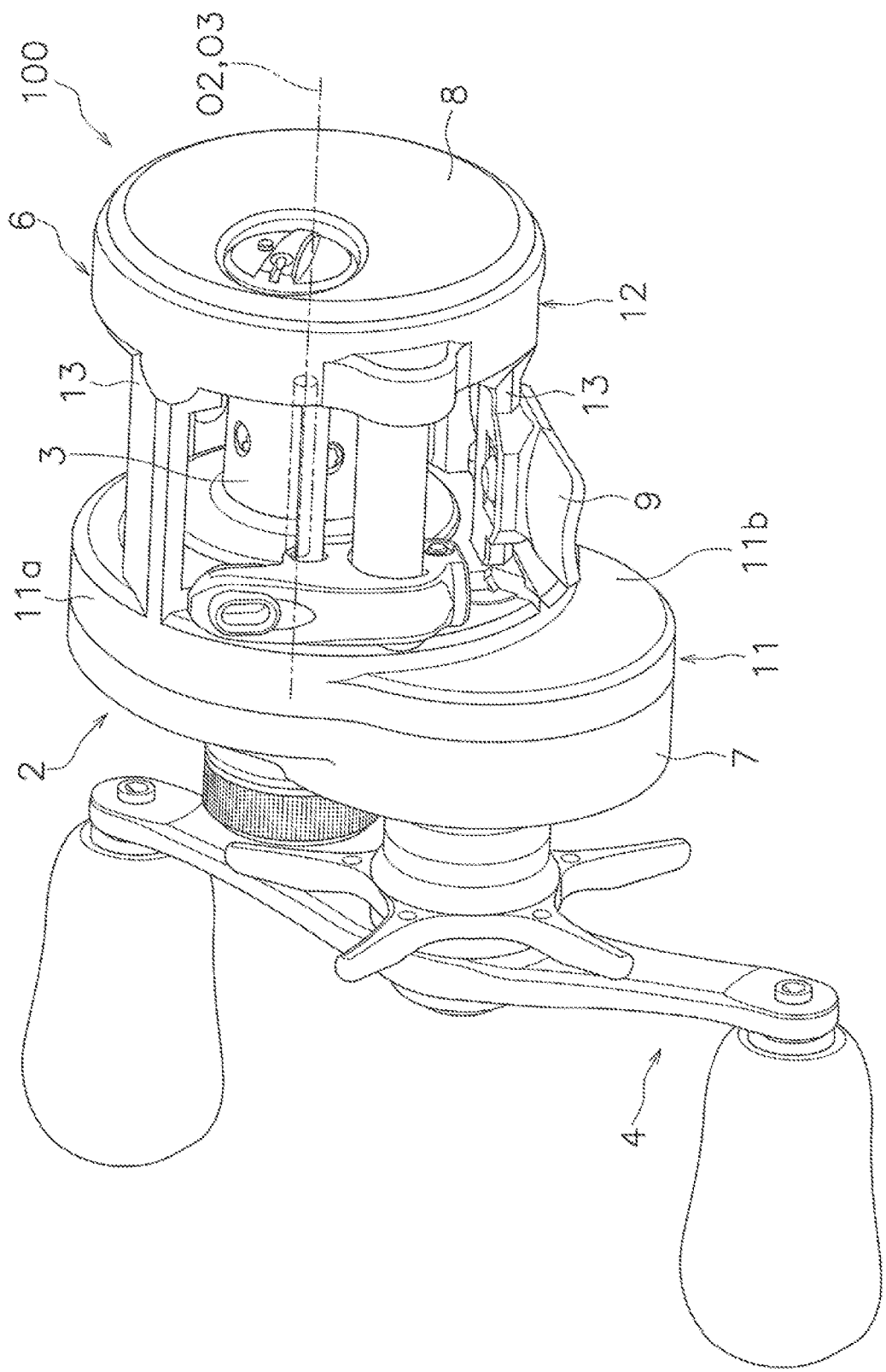
FIG. 1 is a perspective view of a dual-bearing reel.
Figure 2:
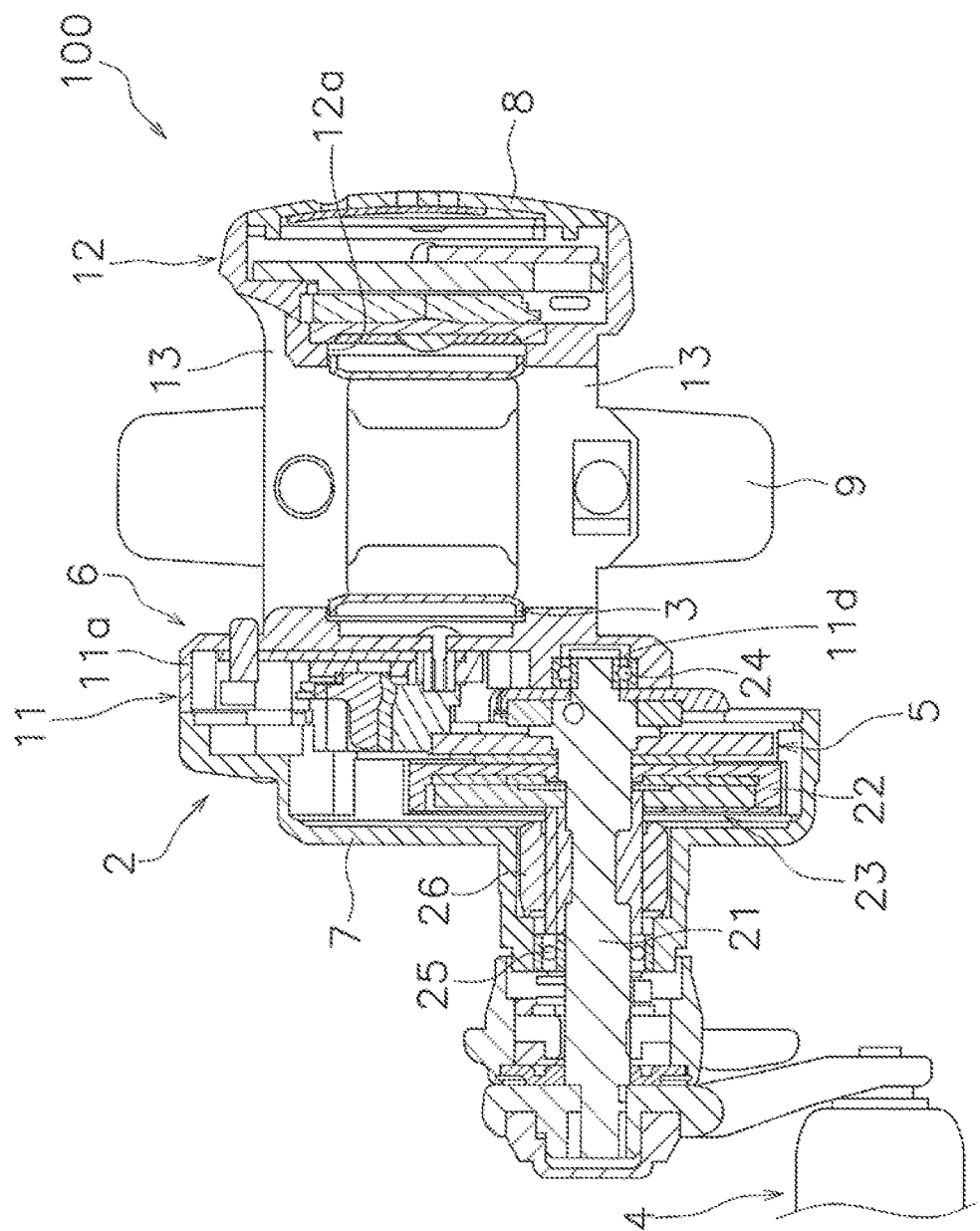
FIG. 2 is a cross-sectional view of the dual-bearing reel.

Hereinafter, an embodiment of a dual-bearing reel 100 according to the present invention will be described with reference to the drawings. FIG. 1 is a perspective view of the dual-bearing reel 100. FIG. 2 is a cross-sectional view of the dual-bearing reel 100. In the following description, the term "front" refers to the direction in which the fishing line is drawn out during fishing, and the term "back" is the opposite direction thereof. For example, the front refers to the right side in FIG. 1, and the back refers to the left side in FIG. 1. Further, the direction in which a spool shaft 10 (explained later) extends will be described as the axial direction, and the direction orthogonal to the axial direction will be described as the radial direction.

The dual-bearing reels 100 is configured to feed a fishing line forward. The dual-bearing reel 100 includes a reel body 2, a spool 3, a handle 4, and a rotation transmission mechanism 5. Further, the dual-bearing reel 100 includes a clutch mechanism, a casting control mechanism, a spool braking mechanism, and a level wind mechanism, as in the conventional dual-bearing reels.

The reel body 2 has a frame 6, a first side cover 7, a second side cover 8, and a rod mounting portion 9.

Figure 3:
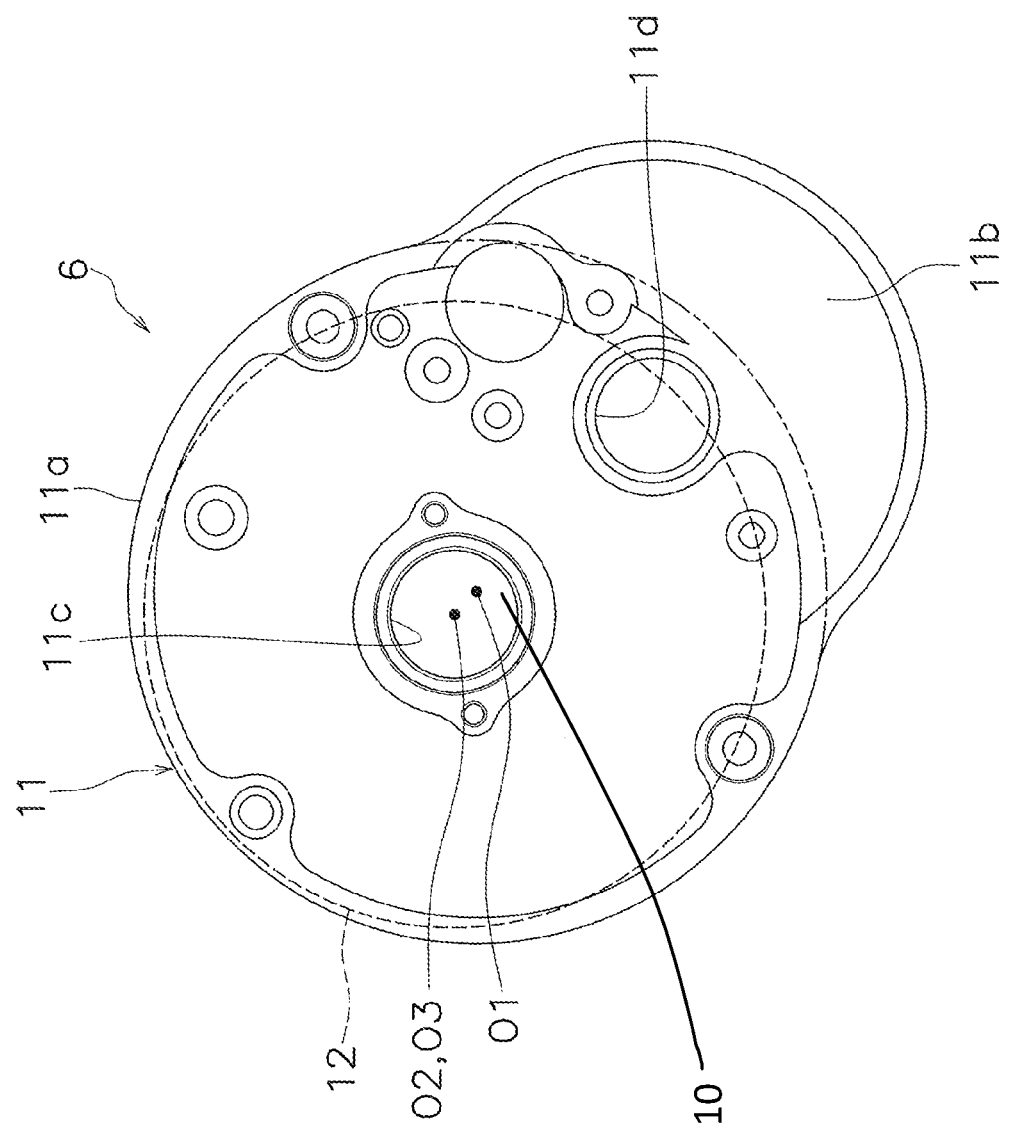
FIG. 3 is a view of a frame from a handle side.
Figure 4:
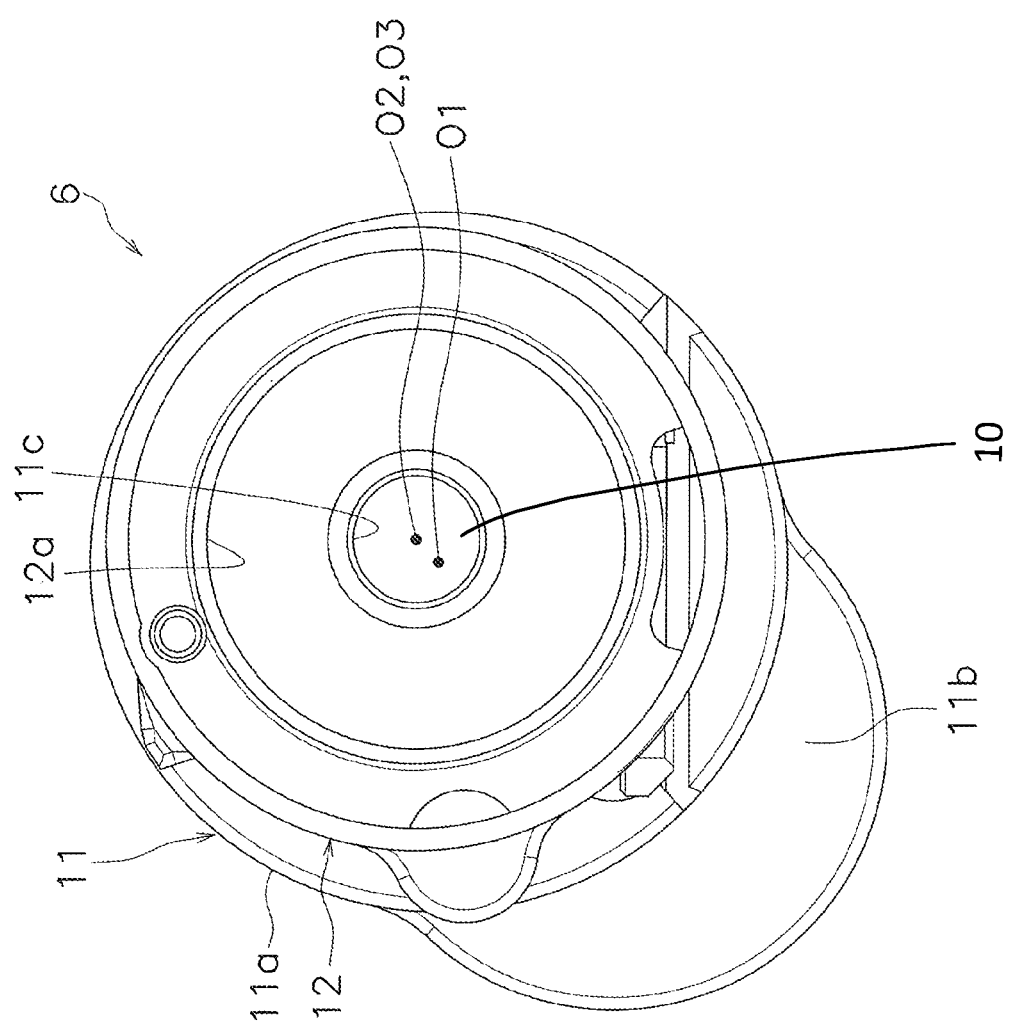
FIG. 4 is a view of the frame from a non-handle side.

FIG. 3 shows the frame 6 as viewed from the handle side. FIG. 4 shows the frame 6 as viewed from the non-handle side. The frame 6 has a first side plate 11, a second side plate 12, and a plurality of connecting portions 13. The first side plate 11 is substantially circular and disposed on the handle-side portion of the frame 6. The first side plate 11 has a circular portion 11a and a bulging portion 11b.

The circular portion 11a has a circular shape. The circular portion 11a has a through-hole 11c where the spool shaft 10 is mounted, and a support hole 11d supporting one end of a drive shaft 21 described later. As shown in FIG. 3, the through-hole 11c has a center that is displaced from a central axis O1 of the circular portion 11a.

The bulging portion 11b bulges outward in the radial direction from the circular portion 11a. Specifically, the bulging portion 11b bulges forward and downward from the outer edge of the circular portion 11a. In FIG. 3, the boundary between the circular portion 11a and the bulging portion 11b is indicated by a two-dot chain line.

As shown in FIGS. 2 and 4, the second side plate 12 is circular and has an opening 12a used for disassembling the spool 3. As shown in FIG. 4, a central axis O2 of the second side plate 12 is displaced from the central axis O1 of the circular portion 11a of the first side plate 11. Specifically, the central axis O1 of the circular portion 11a of the first side plate 11 is offset forward and downward from the central axis O2 of the second side plate 12.

The plurality of connecting portions 13 extend in the axial direction and connect the first side plate 11 and the second side plate 12.

The first side cover 7 is fixed to the first side plate 11 so as to cover the first side plate 11 from the handle side. The second side cover 8 is fixed to the second side plate 12 so as to cover the second side plate 12 from the non-handle side. The second side cover 8 can be integral with the second side plate 12.

The rod mounting portion 9 is a portion where a fishing rod is mounted. The rod mounting portion 9 is disposed between the first side plate 11 and the second side plate 12, and disposed below the spool 3. The rod mounting portion 9 extends in the front-back direction and is fixed to the connecting portions 13. The rod mounting portion 9 can be integral with the frame 6.

The spool 3 is a member around which a fishing line is wound. The spool 3 is rotatably supported by the reel body 2. The spool 3 of the present embodiment is fixed to the spool shaft 10 which extends along the center of the spool 3 in the axial direction, and rotates integrally with the spool shaft 10 between the first side plate 11 and the second side plate 12. A rotation axis O3 of the spool 3 is coincident with the central axis of the spool shaft 10. As shown in FIGS. 3 and 4, the rotation axis O3 of the spool 3 is coincident with the central axis O2 of the second side plate 12. The spool shaft 10 is rotatably supported by the reel body 2 via a bearing (not shown) disposed in the reel body 2.

The handle 4 is rotatably mounted on the first side plate 11 of the reel body 2. In accordance with the rotation operation of the handle 4, the spool 3 rotates together with the spool shaft 10 via the rotation transmission mechanism 5.

As shown in FIG. 2, the rotation transmission mechanism 5 is disposed in the space defined by the first side cover 7 and the first side plate 11. The rotation transmission mechanism 5 transmits the rotation of the handle 4 to the spool 3 through the spool shaft 10. The rotation transmission mechanism 5 includes the drive shaft 21, a drive gear 22, a pinion gear (not shown), and a drag mechanism 23.

The drive shaft 21 is non-rotatably connected to the handle 4. The drive shaft 21 is rotatably supported by the reel body 2 via a bearing 24 and a bearing 25. The bearing 24 is disposed in the support hole 11d of the first side plate 11. The bearing 25 is disposed in the first side cover 7. The drive shaft 21 is prohibited from rotating in the fishing line feeding direction by a one-way clutch 26 that is located inside the first side cover 7.

The drive gear 22 is mounted on the drive shaft 21. The pinion gear is a tubular member through which the spool shaft 10 extends in the axial direction. The pinion gear meshes with the drive gear 22. The drag mechanism 23 brakes the rotation of the spool 3 in the fishing line feeding direction. Since the drag mechanism 23 has the same configuration as conventional ones, the description thereof will be omitted. The rotation of the handle 4 in the fishing line winding direction is transmitted to the spool 3 through the drive shaft 21, the drag mechanism 23, the drive gear 22, the pinion gear, and the spool shaft 10.

In the dual-bearing reel 100 having the above configuration, the central axis O1 of the circular portion 11a of the first side plate 11 is offset forward and downward from the central axis O2 of the second side plate 12. That is, the central axis O1 of the circular portion 11a of the first side plate 11 is offset in the direction in which the bulging portion 11b of the first side plate 11 bulges with respect to the central axis O2 of the second side plate 12. Accordingly, it is possible to reduce an unnecessary space in and around the upper and back portions of the circular portion 11a of the first side plate 11. As a result, the handle-side portion of the reel body 2 can be downsized.

Although the embodiments of the present invention have been described above, the configuration of the present invention is not limited to these embodiments and can be changed without departing from the gist of the present invention.

In the above embodiment, the spool 3 is fixed to the spool shaft 10, but the present invention can be adopted for a configuration in which the spool 3 rotates with respect to the spool shaft 10 or a configuration in which the spool shaft 10 is separated.

In the above embodiment, the handle 4 is located on the left side as viewed from the front, but the present invention can be adopted for dual-bearing reels in which the handle 4 is located on the right side as viewed from the front.

In the above embodiment, the circular portion 11a of the first side plate 11 and the second side plate 12 are circular, but the circular portion 11a of the first side plate 11 and the second side plate 12 can be substantially circular and do not have to be perfectly circular.

REFERENCE SIGNS LIST

2 Reel body
3 Spool
4 Handle
11 First side plate
11a Circular portion
11b Bulging portion
12 Second side plate
13 Connecting portion
100 Dual-bearing reel
O1 Central axis of circular portion
O2 Central axis of second side plate
O3 Rotation axis of spool

The invention claimed is:

1. A dual-bearing reel configured to feed a fishing line forward, the dual-bearing reel comprising:
a reel body including a first side plate having a circular portion and a bulging portion bulging forward and downward from the circular portion, a second side plate that is circular and disposed apart from the first side plate, and a connecting portion connecting the first side plate and the second side plate;
a handle rotatably mounted on the first side plate; and
a spool rotatably supported on the reel body, wherein
the circular portion of the first side plate has a first central axis that is offset forward and downward from a second central axis of the second side plate, and
the spool has a rotation axis that is coaxial with the second central axis of the second side plate.

2. The dual-bearing reel according to claim 1, wherein
the rotation axis of the spool is coincident with the second central axis of the second side plate.

3. A dual-bearing reel configured to feed a fishing line forward, the dual-bearing reel comprising:
a reel body including a first side plate having a substantially circular portion and a bulging portion, a second side plate that is substantially circular and disposed apart from the first side plate, and a connecting portion connecting the first side plate and the second side plate, the substantially circular portion of the first side plate including a first central axis and a through-hole having a center that is displaced from the first central axis;
a handle rotatably mounted on the first side plate; and a spool shaft disposed in the through-hole, a rotation axis of the spool shaft being offset from the first central axis.

4. The dual-bearing reel according to claim 3, wherein the first central axis is offset from a second central axis of the second side plate.

5. The dual-bearing reel according to claim 4, wherein the first central axis is offset from the second central axis in the direction in which the bulging portion bulges with respect to the substantially circular portion of the first side plate.

* * * * *